US012738803B2

(12) United States Patent
Kim et al.

(10) Patent No.: US 12,738,803 B2
(45) Date of Patent: Sep. 15, 2026

(54) MOTOR FOR LAUNDRY APPARATUS

(71) Applicant: LG ELECTRONICS INC., Seoul (KR)

(72) Inventors: Kyeong-Hwan Kim, Seoul (KR); Seung-Suk Oh, Seoul (KR); Hyojin Ko, Seoul (KR); Yoonuk Kim, Seoul (KR); Jun Young Song, Seoul (KR)

(73) Assignee: LG Electronics Inc., Seoul (KR)

( * ) Notice: Subject to any disclaimer, the term of this patent is extended or adjusted under 35 U.S.C. 154(b) by 171 days.

(21) Appl. No.: 18/729,612

(22) PCT Filed: Jan. 12, 2023

(86) PCT No.: PCT/KR2023/000608

§ 371 (c)(1),
(2) Date: Jul. 17, 2024

(87) PCT Pub. No.: WO2023/167411

PCT Pub. Date: Sep. 7, 2023

(65) Prior Publication Data

US 2026/0180393 A1 Jun. 25, 2026

(30) Foreign Application Priority Data

Mar. 3, 2022 (KR) ........................ 10-2022-0027455

(51) Int. Cl.

| | |
|---|---|
| ***H02K 5/26*** | (2006.01) |
| ***F01D 11/00*** | (2006.01) |
| ***H02K 5/02*** | (2006.01) |
| ***H02K 19/14*** | (2006.01) |

(52) U.S. Cl.

CPC ............. *H02K 5/26* (2013.01); *F01D 11/005* (2013.01); *H02K 5/02* (2013.01); *H02K 19/14* (2013.01)

(58) Field of Classification Search

CPC .......... F01D 11/005; H02K 5/26; H02K 5/02; H02K 19/14

See application file for complete search history.

(56) References Cited

U.S. PATENT DOCUMENTS

| | | | |
|---|---|---|---|
| 10,697,101 B2 | 6/2020 | Cho et al. | |
| 2005/0166643 A1 | 8/2005 | Cho et al. | |
| 2009/0120137 A1 | 5/2009 | Cho et al. | |
| 2023/0283129 A1* | 9/2023 | Kim | H02K 1/32 |

FOREIGN PATENT DOCUMENTS

| | | |
|---|---|---|
| KR | 10-2004-0075253 | 8/2004 |
| KR | 10-2005-0122565 | 12/2005 |
| KR | 10-20050118538 A | 12/2005 |
| KR | 10-2006-0031275 | 4/2006 |
| KR | 10-2006-0054531 | 5/2006 |
| WO | 2018228172 A1 | 12/2018 |

OTHER PUBLICATIONS

Extended European Search Report in European Appln. No. 23763610.5, mailed on May 20, 2025, 7 pages.

* cited by examiner

*Primary Examiner* — Sean Gugger
(74) *Attorney, Agent, or Firm* — Fish & Richardson P.C.

(57) ABSTRACT

An embodiment of the present invention relates to a motor for a laundry apparatus, comprising: a stator comprising a core and a coil; and a rotor comprising a magnet and a rotor frame, wherein the rotor frame comprises a base frame, an extension frame, an edge portion, and a suction port disposed on the edge portion. Thus, the heat dissipation performance of the motor can be improved while securing the strength of the rotor frame.

22 Claims, 14 Drawing Sheets

【FIG. 1】
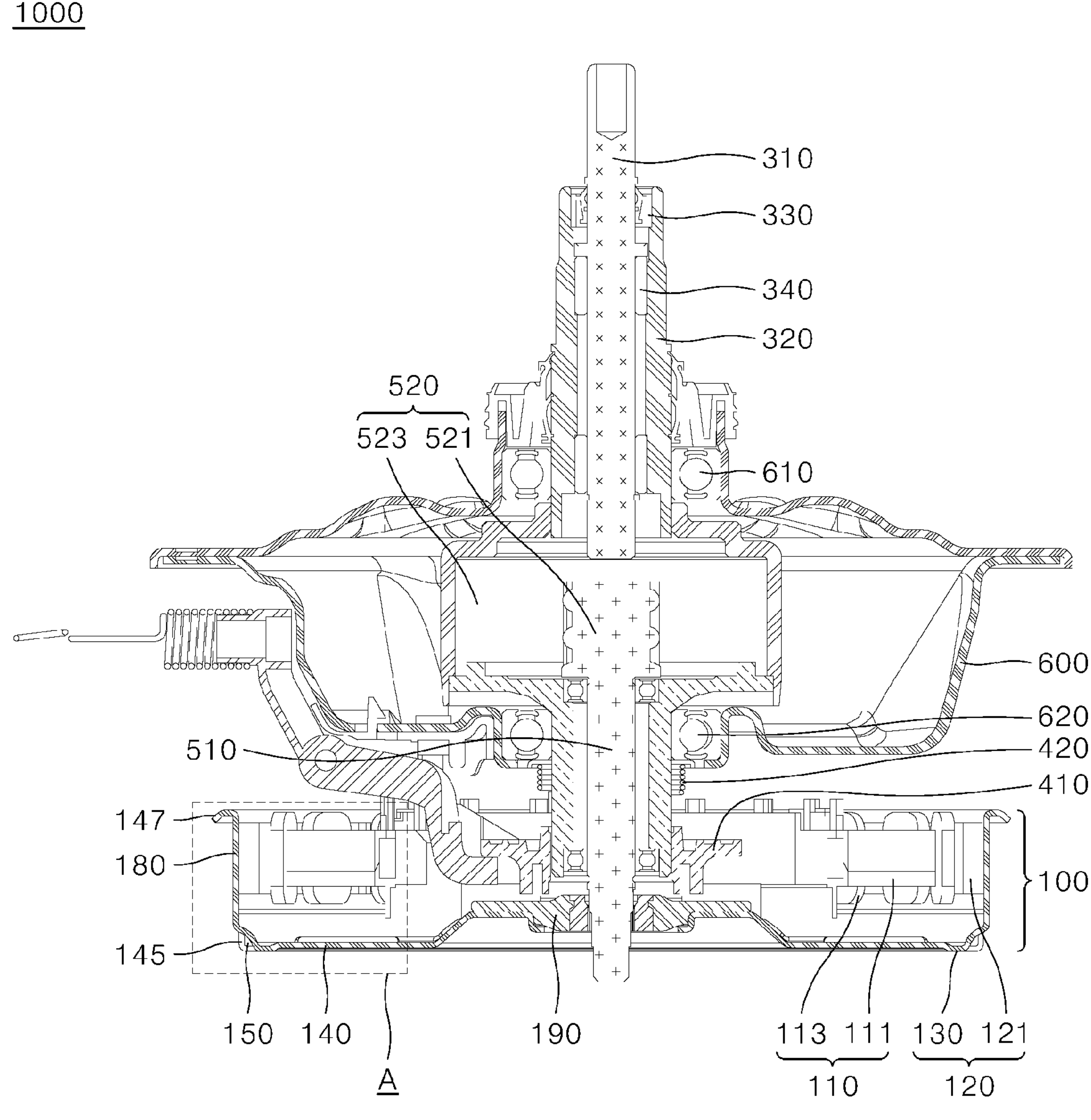

【FIG. 2】
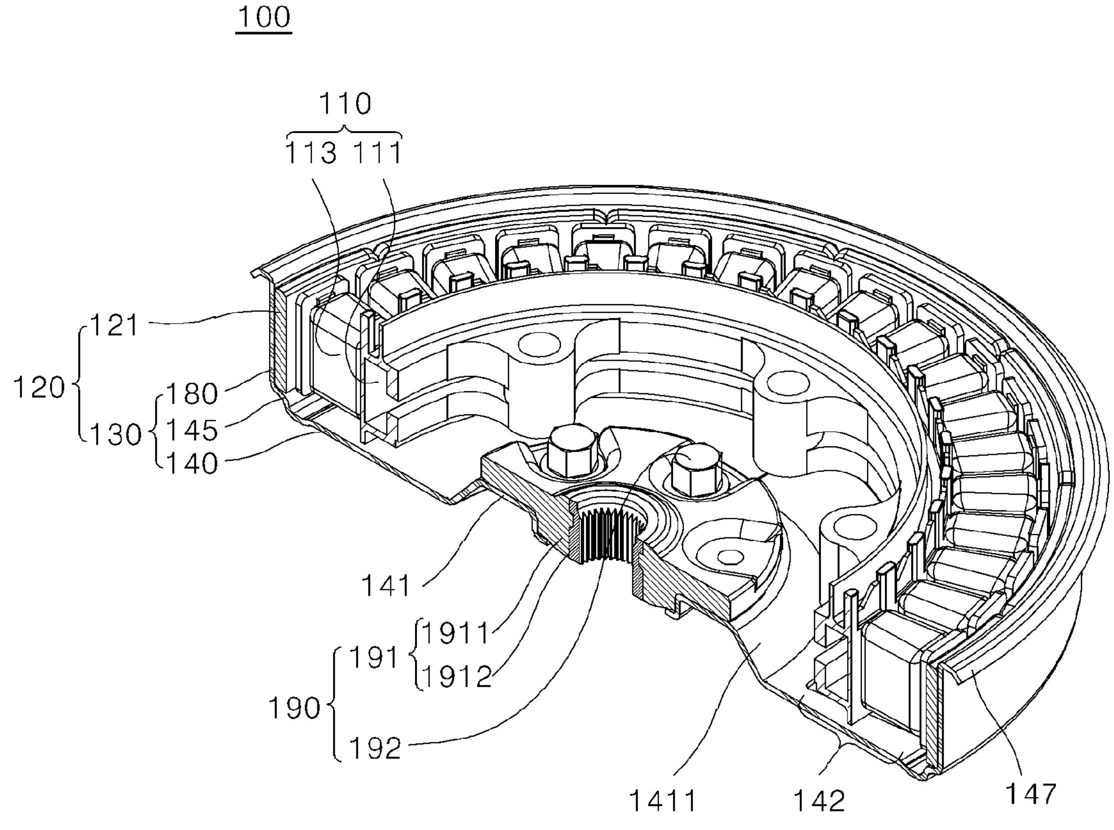

【FIG. 3】
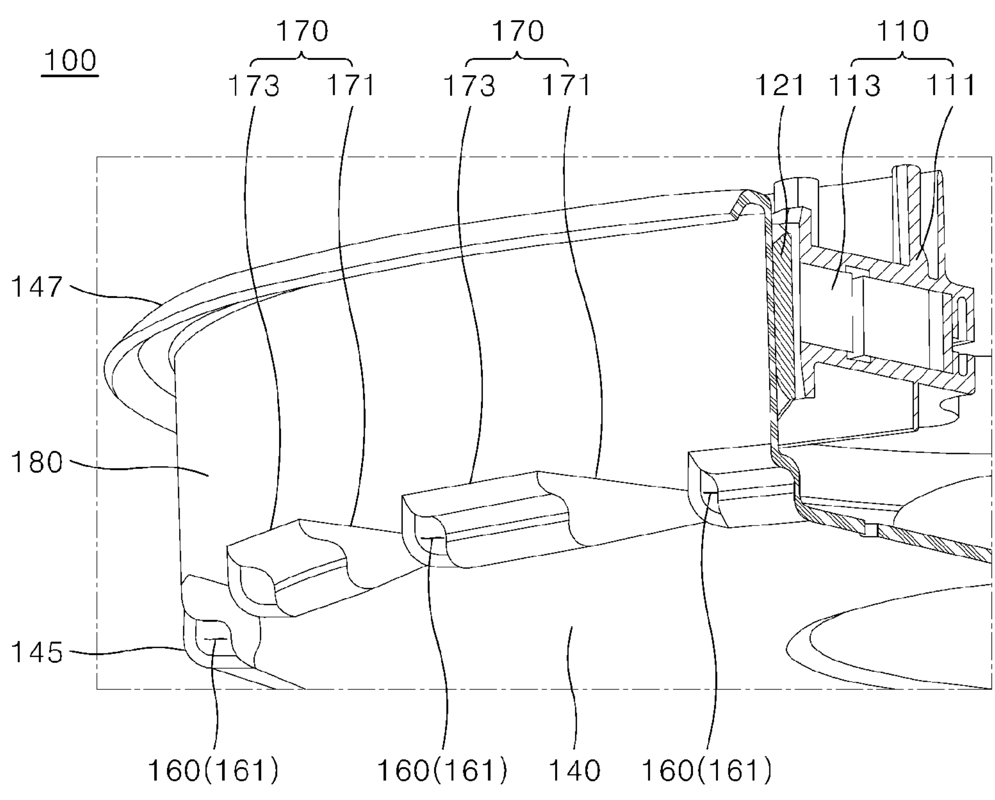

【FIG. 4】
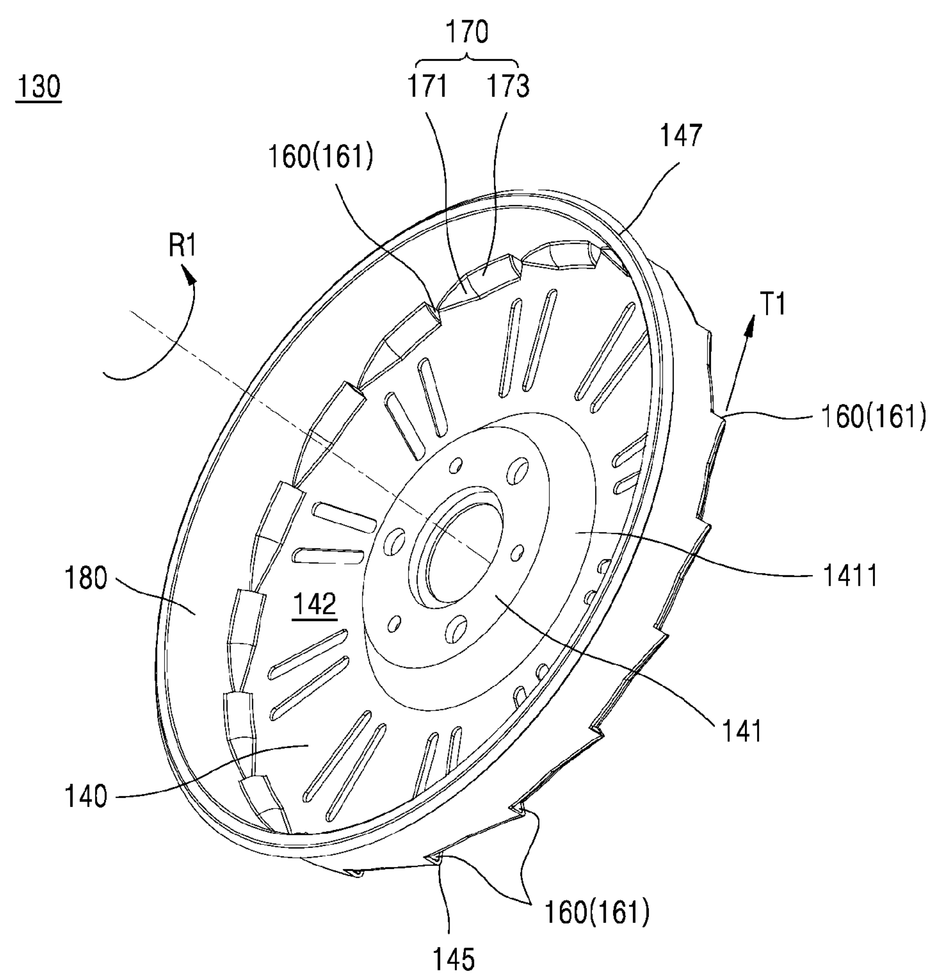

【FIG. 5】
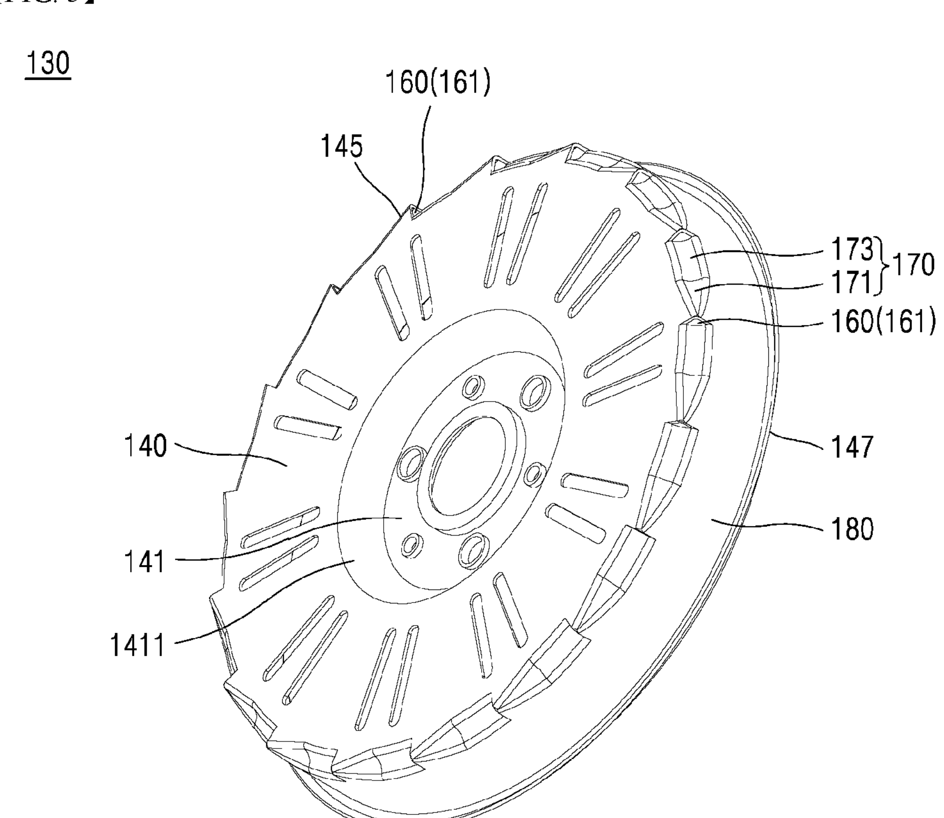

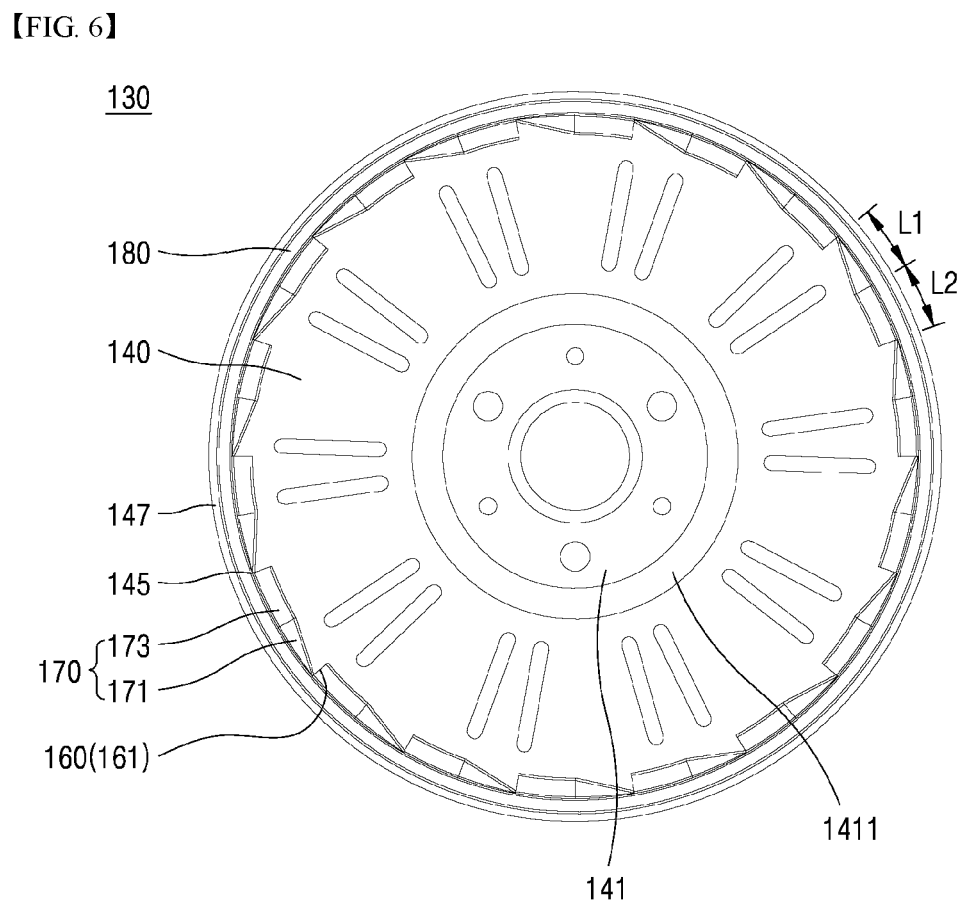

【FIG. 7】
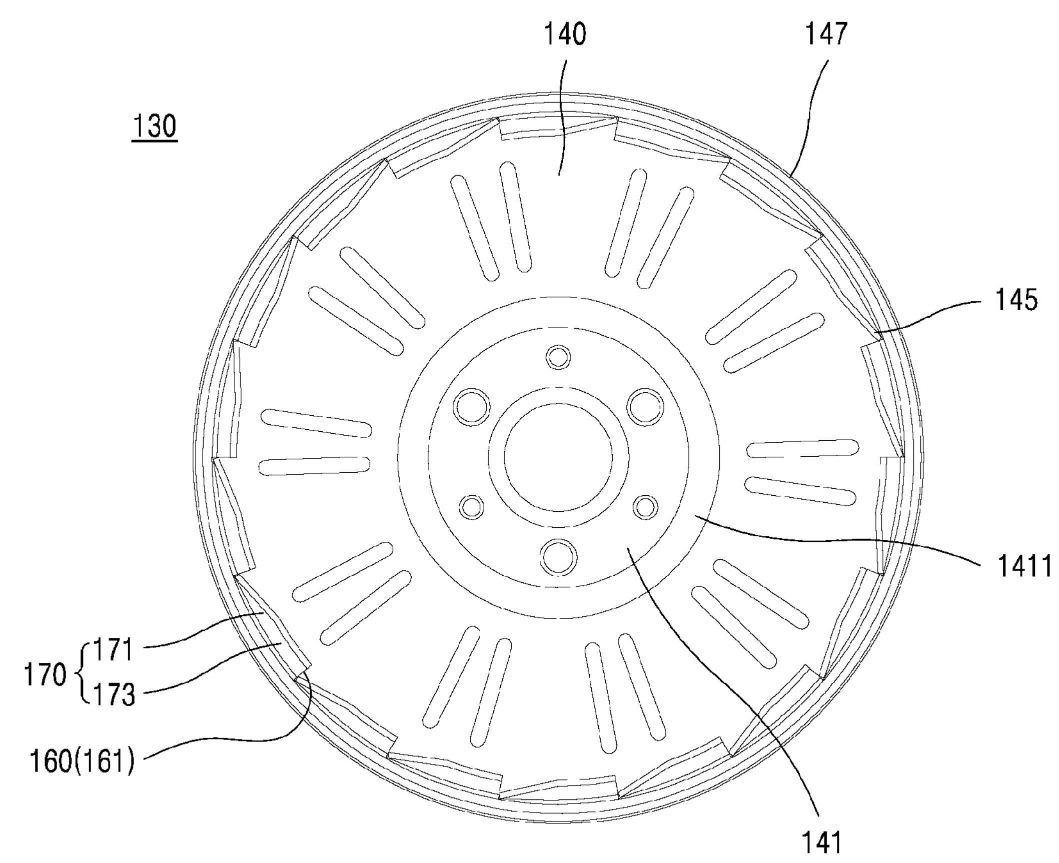

【FIG. 8】
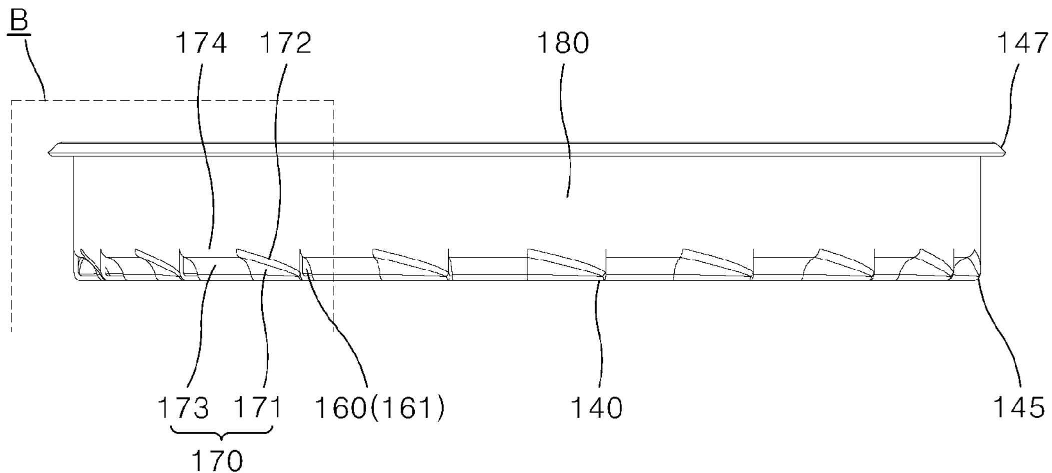
【FIG. 9】
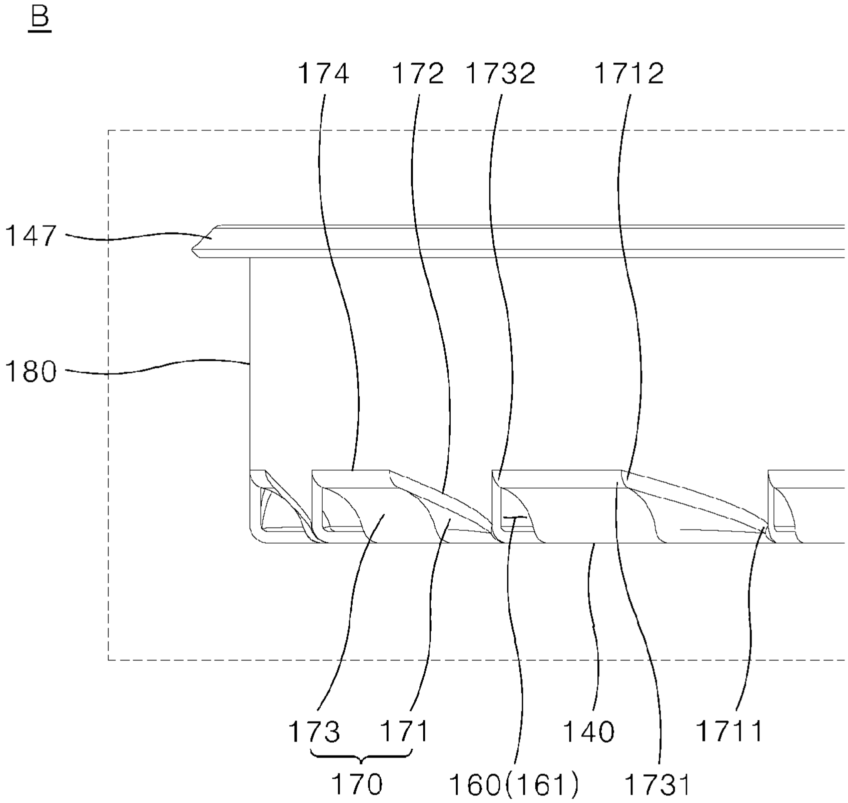

【FIG. 10】
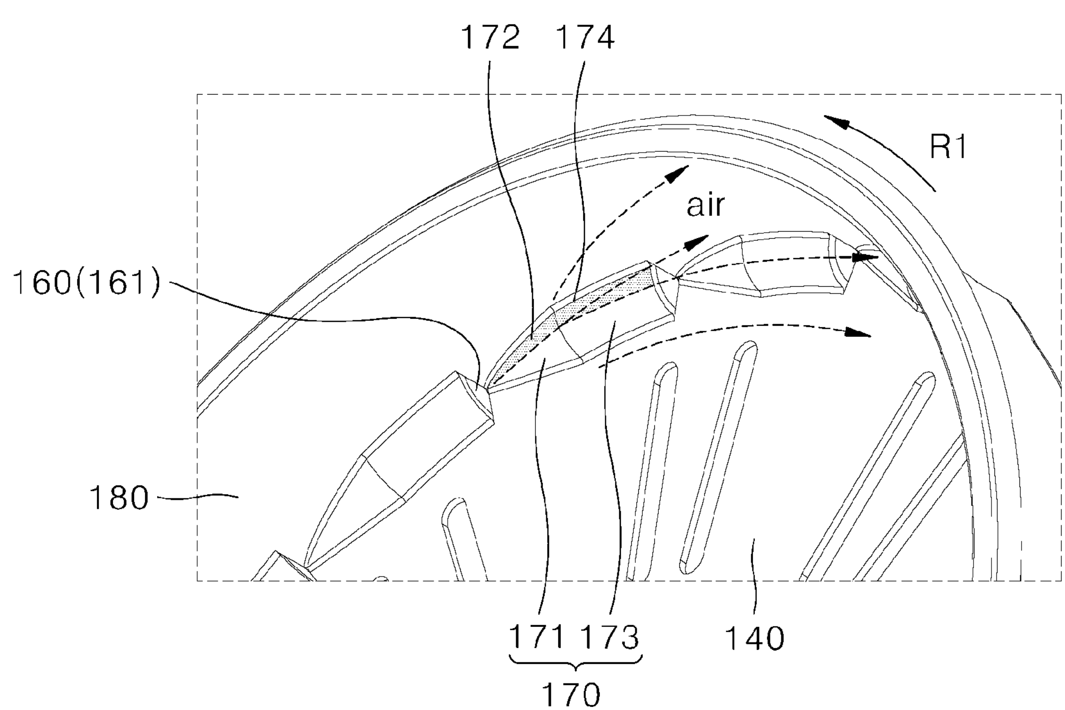

【FIG. 11】
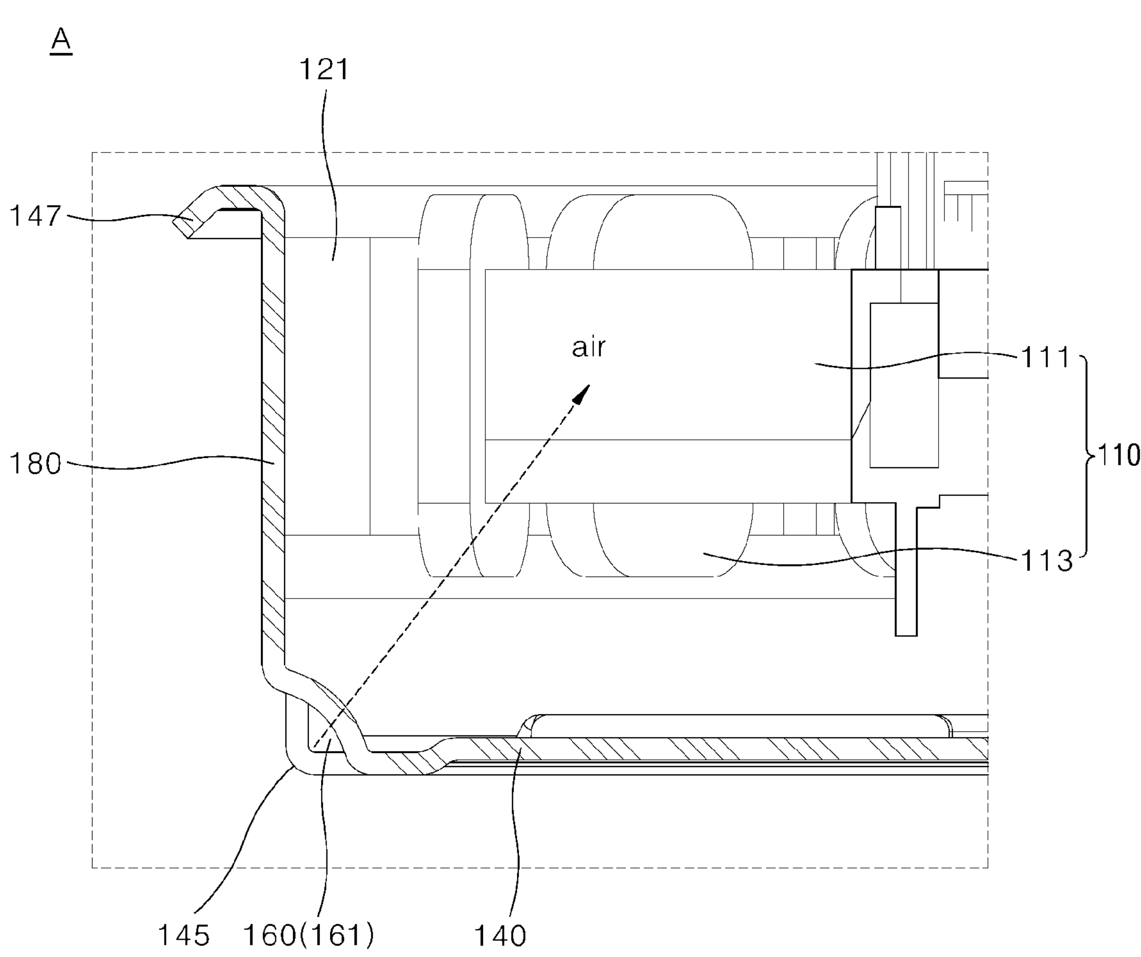

【FIG. 12】
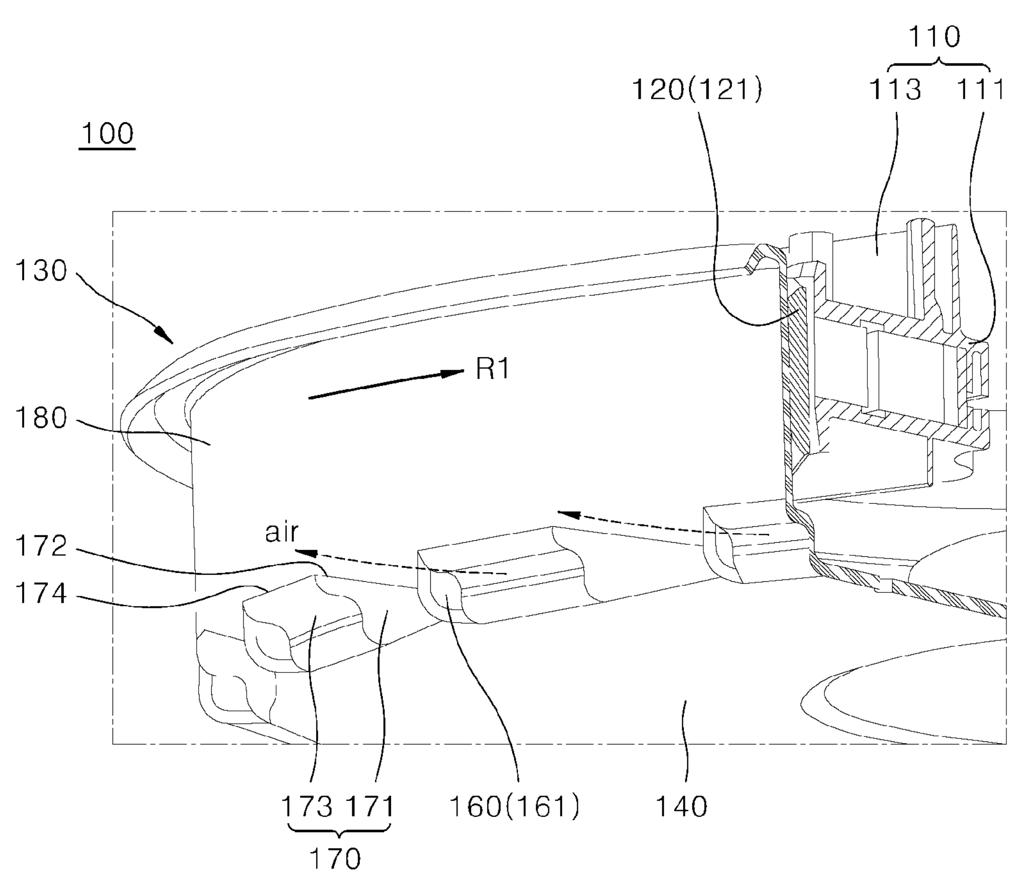

【FIG. 13】
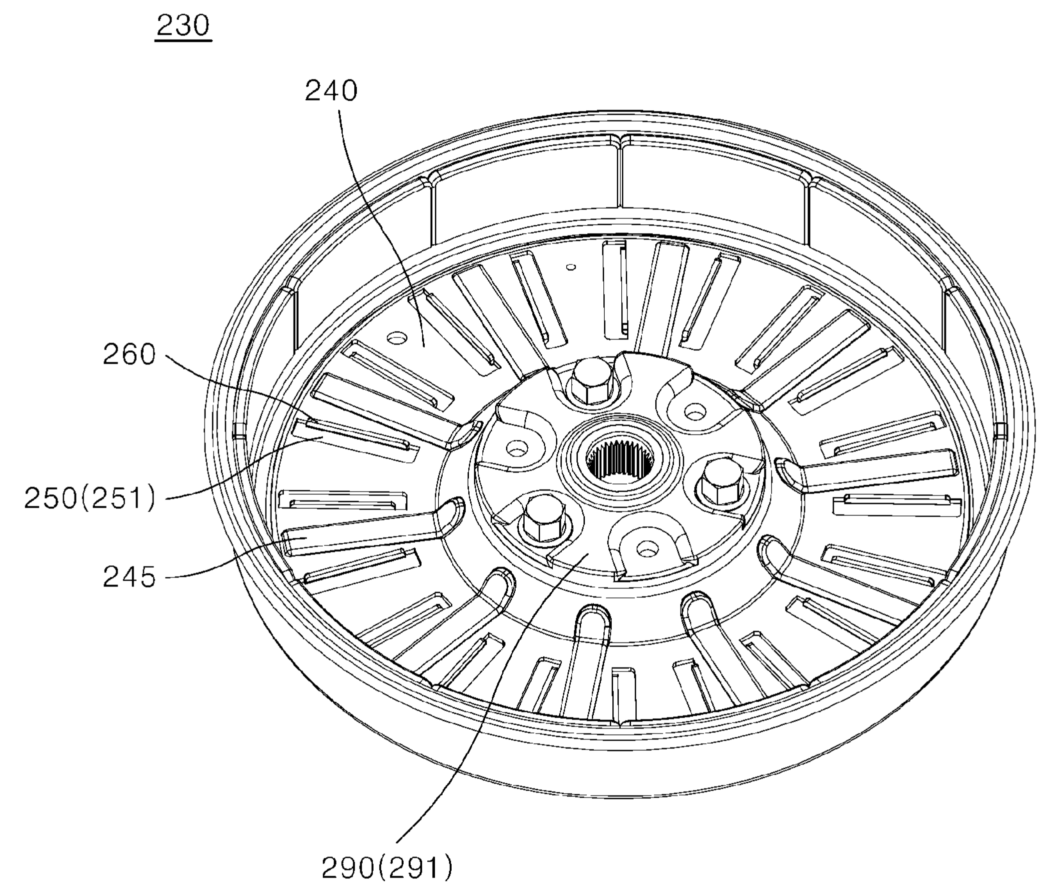

【FIG. 14】
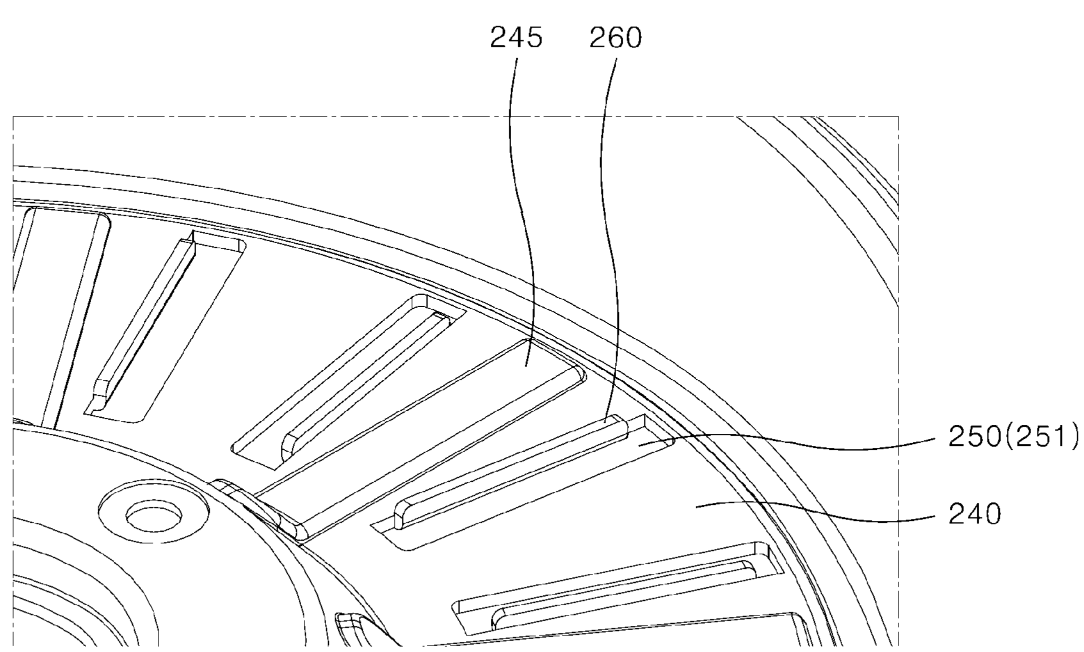

【FIG. 15】
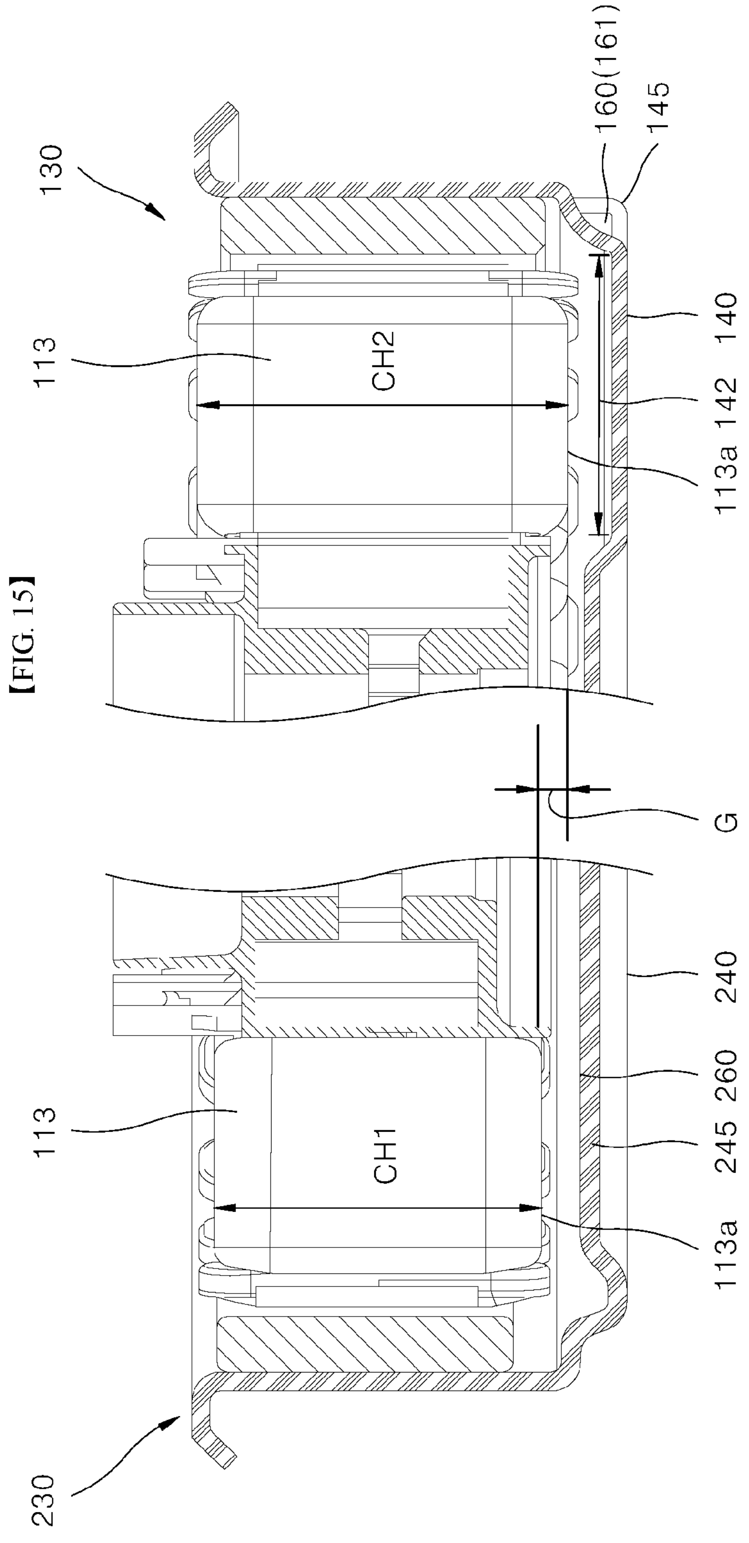

MOTOR FOR LAUNDRY APPARATUS

CROSS-REFERENCE TO RELATED APPLICATIONS

This application is a National Stage application under 35 U.S.C. § 371 of International Application No. PCT/KR2023/000608 filed on Jan. 12, 2023, which claims the benefit of Korean Application No. 10-2022-0027455, filed on Mar. 3, 2022. The disclosures of the prior applications are incorporated by reference in their entirety.

TECHNICAL FIELD

The present disclosure relates to a motor for a laundry apparatus, and in particular, a motor for a laundry apparatus in which a suction port is disposed at an edge portion of a rotor frame, to prevent deterioration in the stiffness of the rotor frame, caused by the formation of the suction port, and to promote a cooling effect on a coil, such that the heat dissipation performance of the motor improves.

BACKGROUND ART

Particulars described hereinafter are intended to provide background information in relation to embodiments of the present disclosure, and certainly, do not constitute related art.

Laundry apparatuses comprise a clothing processing device such as washing machines that wash clothes, dryers that dries wet clothes after a wash, and the like.

A washing machine comprises a water tank accommodating wash water, a rotation tub rotating in the water tank, a pulsator rotating in the rotation tub, a motor providing a rotational force to the rotation tub and the pulsator, and the like.

In the case where a wash target is inserted into the rotation tub, the wash target in the rotation tub is stirred with wash water based on rotation of the pulsator and the rotation tub that are rotated by the motor. As a result, contaminants of the wash target are removed.

The motor of the washing machine shaft-connects to the pulsator, and transfers a rotational force to the pulsator to rotate the pulsator. Additionally, the motor of the washing machine selectively transfers a rotational force to the rotation tub and rotates the rotation tub, based on an operation of a clutch. The washing machine, as described above, may embody an operation in a washing mode and a dehydrating mode by selectively using a rotation motion of the pulsator and a rotation motion of the rotation tub.

Additionally, an outer rotor type motor may be used for a laundry apparatus such as a washing machine and the like.

The outer rotor type motor denotes a motor having an outer rotor. In other words, the outer rotor type motor is a motor in which a rotor rotates outside a stator, and secures high inertia and is appropriate for a rotation of constant speed and high-speed driving.

Further, in the outer rotor type motor, a magnet of the rotor may have a large size. Accordingly, high torque may be exerted.

For example, a shaft driving the washing machine, i.e., a washing shaft, connects to the rotor, and the washing shaft is directly supplied with a rotational force of the rotor to rotate.

In recent years, there is a growing demand for a highly efficient motor that is used for a laundry apparatus such as a washing machine and the like at a time when the capacity of a home appliance becomes higher. To this end, a rotor frame included in the motor needs to secure the stiffness of the motor itself, and needs to have a heat dissipation function of cooling the motor and dissipating the heat of the motor.

To secure the heat dissipation function of the motor, a suction port and a blade that suction external air into the motor need to be formed at the rotor frame facing the lower portion of a coil.

However, in the case where the suction port and the blade are formed on the bottom (i.e., a base frame) of the rotor frame, a plurality of holes is formed on the bottom (i.e., the base frame) of the rotor frame, causing deterioration in the stiffness of the rotor frame. Further, a coil winding space lacks due to the height of the blade, resulting in an increase in the size of the motor.

The rotor frame, as described above, needs to have a function of securing the stiffness of the motor, and a function of enhancing the heat dissipation performance of the motor, but in an existing structure, it is difficult to secure the stiffness and heat dissipation performance of the motor at the same time.

A motor and a washing machine with the motor are disclosed in KR Patent Publication No. 10-2004-0075253 (hereinafter, prior art document 1) as a prior art document in relation to the subject matter of the present disclosure.

In the motor according to prior art document 1, a cooling hole is formed on the bottom surface of a rotor cup (i.e., a rotor frame), and a lower blade is provided on the bottom surface of the rotor cup (i.e., the rotor frame), near the cooling hole, in such a way that the lower blade protrudes to have a predetermined height. Additionally, a vent is additionally formed on the lateral surface of the rotor cup (i.e., the frame) such that air in the rotor cup (i.e., the rotor frame) is ventilated outward.

The motor disclosed in prior art document 1 has a structure in which a plurality of holes (i.e., the cooling ole and the vent) is formed on the lower surface and lateral surface of the rotor cup (i.e., the rotor frame), causing deterioration in the stiffness of the rotor cup (i.e., the rotor frame) itself and making it difficult to secure the stiffness of the motor.

Additionally, the motor disclosed in prior art document 1 has a structure in which a plurality of blades having a predetermined height protrudes on the lower surface of the rotor cup (i.e., the rotor frame), disposed to face a coil, resulting in a decrease in the coil winding space and an increase in the size of the moor.

Further, since a heat dissipation structure of the motor disclosed in prior art document 1 is not a structure that guides a flow of air for cooling toward the coil, the heat dissipation structure may not be enough to ensure improvement in the heat dissipation performance of the motor.

Further, since the blade structure applied to the heat dissipation structure of the motor disclosed in prior art document 1 is a backward type structure, a mold becomes complex, and manufacturability deteriorates in the case where a backward type blade is formed inside the frame. Further, it is difficult to increase the number of backward type blade structures in the case where the backward type blade structures are applied to a frame of a constant surface area. Further, in the case of a motor having a large number of teeth, a coil may be wound around places, and at this time, cooling performance between coils may deteriorate.

A motor for a washing machine is disclosed in U.S. Pat. No. 10,697,101 (hereinafter, prior art document 2) as another prior art document in relation to the subject matter of the present disclosure.

The motor disclosed in prior art document 2 has a first ring portion and a second ring portion at a base part of a rotor casing (i.e. a rotor frame). The first ring portion faces a stator coil part, and the second ring portion is disposed near the center of the rotor casing (i.e., the rotor frame) and does not face the stator coil part. Additionally, the second ring portion has a plurality of air inflow holes.

However, even in the motor disclosed in prior art document 2, a plurality of holes (i.e., air inflow holes) is formed on the lower surface, i.e., at the base part, of the rotor casing (i.e., the rotor frame) in such a way that the plurality of holes penetrates the base part in the thicknesswise direction thereof, causing deterioration in the stiffness of the rotor casing (i.e., the rotor frame).

In other words, in the case where the base part of the rotor casing, formed as described above as a structure shaped into a plate, has the plurality of air inflow holes, the stiffness of the rotor casing deteriorates at a time of high-speed rotation, causing deformation. As a result, the stiffness of the motor deteriorates.

A rotor structure of a motor for a front load washing machine is disclosed in KR Patent Publication No. 10-2006-0031275 (hereinafter, prior art document 3) as yet another prior art document in relation to the subject matter of the present disclosure.

In the rotor structure of the motor disclosed in prior art document 3, an elongated hole is formed radially on the lower surface of a rotor, and a blade is provided in the elongated hole.

Even in the motor disclosed in prior art document 3, a plurality of elongated holes is formed in the lower surface portion of the rotor, causing deterioration in the stiffness of the rotor.

Furthermore, since the blade is disposed to face the lower portion of a coil, a coil winding space decreases, and accordingly, the size of the motor needs to increase.

To solve the problem, there is a growing need to ensure a structure in which a plurality of holes is not formed on the lower surface (or the lateral surface) of the rotor frame to secure the stiffness of a motor, while lack of a coil winding space, caused by a blade, is prevented to enhance the output and heat dissipation performance of the motor.

DESCRIPTION OF THE INVENTION

Technical Problems

The objective of the present disclosure is to provide a motor for a laundry apparatus, in which a suction port is formed at an edge portion of a rotor frame securing more stiffness than a base frame and an extension frame of the rotor frame, at a time when a hole is formed, in terms of an outer rotor type motor comprising an outer rotor, such that the stiffness of the motor improves.

The objective of the present disclosure is to provide a motor for a laundry apparatus, in which a structure such as a suction port or a blade and the like is not formed at a base frame of a rotor frame, securing a coil winding space as well as stiffness, in terms of an outer rotor type motor comprising an outer rotor, such that the output and efficiency of the motor improve.

The objective of the present disclosure is to provide a motor for a laundry apparatus, in which air suctioned through a suction port disposed at an edge portion of a rotor frame is guided along a plurality of guide structures and flows toward a coil, in terms of an outer rotor type motor comprising an outer rotor, such that cooling performance toward the coil improves.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

According to one aspect, a motor for a laundry apparatus, in which a suction port is formed at an edge portion of a rotor frame securing more stiffness than a base frame and an extension frame of the rotor frame, at a time when a hole is formed, in terms of an outer rotor type motor comprising an outer rotor, may ensure improvement in the stiffness of the motor. Additionally, the motor for a laundry apparatus, in which a structure such as a suction port or a blade and the like is not formed at the base frame of the rotor frame, securing a coil winding space as well as stiffness, may ensure improvement in the output and efficiency of the motor. Further, the motor for a laundry apparatus, in which air suctioned through the suction port disposed at the edge portion of the rotor frame is guided along a plurality of guide structures and flows toward a coil, may ensure improvement in cooling performance toward the coil.

A motor for a laundry apparatus of an embodiment comprises a stator and a rotor.

The stator comprises a core shaped into a ring, and a coil wound around the core.

The rotor comprises a magnet that is disposed outside the stator with an air gap between the magnet and the stator, and a rotor frame that fixes the magnet and rotates outside the stator.

In the motor for a laundry apparatus, the rotor frame comprises a base frame, an extension frame, an edge portion, and a suction port.

The base frame denotes a circular frame disposed to face the coil, with a gap between the base frame and the coil. The base frame is a member that is formed in the lower portion of the rotor frame and has a constant thickness and a plate shape.

The extension frame denotes a frame that protrudes from the edge of the base frame along a circumferential direction and has a circular tube shape. A plurality of magnets is fixed to the inner circumferential surface of the extension frame. The plurality of magnets may be disposed along the inner circumferential surface of the extension frame, in a circular manner and surround the inner circumferential surface of the extension frame in the circumferential direction. The extension frame may be formed on the lateral surface of the rotor frame and have a constant thickness.

The edge portion may be disposed at a connection portion between the extension frame and the base frame.

The edge portion connects between the edge of the base frame shaped into a plate disposed horizontally and the extension frame shaped into a tube and connected vertically from the edge of the base frame in the circumferential direction, in an L shape. The stiffness of the edge portion deteriorates less than the base frame that is shaped into a planar plate or the extension frame that is shaped into a tube and has a constant thickness, when the edge portion is deformed because of formation of a hole and the like. Thus, the deterioration in the stiffness of the rotor frame may be suppressed, and the stiffness of the motor may improve when the suction port is formed at the edge portion than when the suction port is formed at the base frame or the extension frame.

The suction port denotes a structure that comprises a plurality of holes suctioning air outside the motor into the motor to enhance the heat dissipation performance of the motor and is needed to cool the motor.

The suction port may be disposed at the edge portion, and suction air outside the rotor frame into the rotor frame at a time of rotation of the rotor frame.

In the motor for a laundry apparatus, since the suction port is formed at the edge portion as described above, a hole is not formed in the lower portion (i.e., the base frame) of the rotor frame facing the coil, securing the stiffness of the motor readily.

In the motor for a laundry apparatus, a blade is not formed in the lower portion (i.e., the base frame) of the rotor frame facing the coil, securing a sufficient coil winding space. Thus, the size of the motor may decrease, and the output and efficiency of the motor may improve.

The edge portion may connect the base frame and the extension frame in such a way that the base frame and the extension frame are integrated across each other.

For example, the edge portion may have a cross section of an L shape that integrally connects between the base frame disposed horizontally and the extension frame connected vertically from the edge of the base frame.

The suction port comprises plurality of holes that is disposed at the edge portion and suctions air outside the rotor frame into the rotor frame at a time of rotation of the rotor frame.

The plurality of holes may be formed in such a way that the plurality of holes penetrates the edge portion. In case where the plurality of holes is formed at the edge portion as described above, the hole formed at the edge portion may help to prevent deterioration in stiffness further than a hole formed in the lower portion (i.e., the base frame) or the lateral portion (i.e., the extension frame) of the rotor frame. The base frame or the extension frame is shaped into a plate the thickness of which is constant, and in the case where a hole is formed at the portion formed as described above, the plate is highly likely to be deformed at a time when the rotor rotates at high speed. On the contrary, the edge portion, as an L-shaped edge part, secures greater stiffness than the base frame or the extension frame, at a time when a hole is formed.

The plurality of holes may be spaced a predetermined distance apart from each other, along the edge of the base frame, in the circumferential direction, while being formed in such a way that the plurality of holes penetrates the edge portion. Accordingly, external air may be smoothly suctioned into the rotor frame through the plurality of holes disposed in the circumferential direction, at a time when the rotor rotates.

While the plurality of holes is formed in such a way that the plurality of holes penetrates the edge portion, each of the plurality of holes may be formed near the edge of the base frame, toward a tangent line, with respect to a rotation direction of the base frame. Since each of the plurality of holes is formed toward the rotor frame, specifically, toward the tangent line with respect to the rotation direction of the base frame, external air may be suctioned more smoothly at a time of rotation of the rotor. Additionally, since the plurality of holes is disposed the bottom part of the rotor frame, i.e., at an outermost side of the base frame in the radial direction thereof, the plurality of holes is disposed at a position with the highest flow velocity of suctioned air, such that the heat dissipation effect of the motor improves significantly.

The suction port comprises a plurality of holes disposed at the edge portion, and configured to suction air outside the rotor frame into the rotor frame at a time of rotation of the rotor frame, and a plurality of guide structures configured to guide a flow direction of air suctioned into the rotor frame through the plurality of holes, in the rotor frame.

The plurality of guide structures respectively comprises a first guide part.

The first guide part may move a flow direction of air suctioned into the rotor frame through the plurality of holes further upward than each of the plurality of holes by a predetermined height. Accordingly, air suctioned into each of the plurality of holes formed at the edge portion may move up toward the coil along the first guide part. The coil (or the core) corresponds to a main heat generation part of the motor, and the air having moved up along the first guide part may cool the coil (or the core) effectively, ensuring improvement in the heat dissipation performance of the motor.

Further, the first guide part may be formed along the edge portion, inside the rotor frame, and disposed near each of the plurality of holes. Since the first guide part is disposed near each of the plurality of holes as described above, air suctioned through the holes may move up smoothly toward the coil along the first guide part.

The first guide part may be provided with an inclination surface the height of which increases as the inclination surface becomes far away from each of the plurality of holes. The inclination surface may guide a flow direction of air suctioned into the rotor frame through the plurality of holes toward the coil.

The inclination surface may be disposed in the form of a circular arc having a predetermined length, along the edge of the base frame.

For example, one end portion of the first guide part may be disposed close to each of the plurality of holes, and have a height corresponding to the lower end of each of the plurality of holes. On the contrary, the other end portion of the first guide part may be disposed far away from each of the plurality of holes and have a height corresponding to the upper end of each of the plurality of holes.

Additionally, the suction port comprises a plurality of holes and a plurality of guide structures. At this time, each of the plurality of guide structures comprises a first guide part, and a second guide part connecting to the first guide part and having a constant height.

The first guide part may be formed along the edge portion, inside the rotor frame, disposed near each of the plurality of holes, and provided with an inclination surface the height of which increases as the inclination surface becomes far away from each of the plurality of holes.

The second guide part may form a step with the base frame, and be provided with a horizontal surface being at the same height as the upper end of the inclination surface.

The horizontal surface may be disposed in the form of a circular arc having a predetermined length, along the edge of the base frame.

The inclination surface may have a circular arc length corresponding to the horizontal surface.

Further, a motor for a laundry apparatus of an embodiment comprises a stator comprising a core and a coil, a rotor comprising a magnet and a rotor frame, and a driving shaft receiving a rotational force form the rotor frame and rotating.

The stator comprises a core that is shaped into a ring, and a coil that is wound around the core. The rotor comprises a magnet that is disposed outside the stator with an air gap between the magnet and the stator, and a rotor frame that fixes the magnet and rotates outside the stator. The driving shaft may receive a rotational force from the rotor frame to rotate.

The rotor frame comprises a shaft connection part, a base frame, an extension frame, an edge portion, an upper edge portion and a suction port.

The shaft connection part may be disposed at the center in the rotor frame, and connect the driving shaft.

The base frame may be a circular frame that is disposed to face the coil, with a gap between the base frame and the coil.

The extension frame denotes a frame that protrudes from the edge of the base frame in a circumferential direction, fixes a magnet to an inner circumferential surface thereof and has a circular tube shape.

The edge portion may be disposed at a connection portion between the lower end portion of the extension frame and the edge of the base frame.

The upper edge portion may be formed in such a way that the upper edge portion protrudes outward from the upper end portion of the extension frame.

The suction port may be disposed at the edge portion, and suction external air into the rotor frame, based on rotation of the rotor frame.

The suction port comprises a plurality of holes. The plurality of holes may be disposed at the edge portion, and suction air outside the rotor frame into the rotor frame at a time of rotation of the rotor frame.

The plurality of holes may be formed in such a way that the plurality of holes penetrates the edge portion.

The plurality of holes may be spaced a predetermined distance apart from each other along the edge of the base frame in the circumferential direction.

Additionally, the plurality of holes may be formed close to the edge of the base frame, toward a tangent line, with respect to a rotation direction of the base frame.

The suction port comprises a plurality of holes disposed at the edge portion and configured to suction air outside the rotor frame into the rotor frame at a time of rotation of the rotor frame, and a plurality of guide structures configured to guide a flow direction of air suctioned into the rotor frame through the plurality of holes, in the rotor frame. The plurality of guide structures respectively comprises a first guide part and a second guide part.

The first guide part may move a flow direction of air suctioned into the rotor frame through the plurality of holes further upward than each of the plurality of holes by a predetermined height. Accordingly, air suctioned into the rotor frame through the holes may move up along the first guide part and flow toward the coil.

The second guide part may connect to the first guide part and have a constant height. The second guide part may reliably guide air, having moved upward than the base frame by a predetermined height, along the first guide part, such that the air smoothly flows toward the coil.

For example, the first guide part may be formed along the edge portion, inside the rotor frame, disposed near each of the plurality of holes, and provided with an inclination surface the height of which increases as the inclination surface becomes far away from each of the plurality of holes. On the contrary, the second guide part may be shaped into a step that is formed to have a predetermined height from the base frame, and be provided with a horizontal surface being at the same height as the upper end of the inclination surface.

Advantageous Effects

In an embodiment of the present disclosure, a suction port is formed at an edge portion of a rotor frame securing more stiffness than a base frame and an extension frame of the rotor frame, at a time when a hole is formed, in terms of an outer rotor type motor comprising an outer rotor, such that the stiffness of the motor improves.

In an embodiment of the present disclosure, while a structure such as a suction port or a blade and the like is not formed in the lower portion, i.e., at a base frame, of a rotor frame, the heat dissipation performance of the motor may improve. In the embodiment of the present disclosure, a suction port comprising a plurality of holes is formed at an edge portion of the rotor frame, such that the heat dissipation of the motor improves while the stiffness of the motor does not deteriorate. Thus, the stiffness of the motor improves, and a coil winding space is secured as a result of exclusion of a blade, such that the output and efficiency of the motor improves.

In an embodiment of the present disclosure, air suctioned through a suction port disposed at an edge portion of a rotor frame moves up toward a coil along a plurality of guide structures, in terms of an outer rotor type motor comprising an outer rotor. Thus, a cooling effect on the coil (or a core) corresponding to a main heat generation part of the motor may significantly improve, and the heat dissipation performance of the motor may improve.

Specific effects are described along with the above-described effects, in the section of detailed description.

BRIEF DESCRIPTION OF THE DRAWINGS

FIG. 1 is a cross-sectional view showing an entire structure of a driving device for a laundry apparatus of one embodiment.

FIG. 2 is a half cross-sectional perspective view showing a motor for a laundry apparatus of one embodiment.

FIG. 3 is a partial perspective view showing the structure of a suction port of the motor for a laundry apparatus of one embodiment.

FIG. 4 is a front perspective view showing the structure of a rotor frame of the motor for a laundry apparatus of one embodiment.

FIG. 5 is a rear perspective view showing the structure of the rotor frame of the motor for a laundry apparatus of one embodiment.

FIG. 6 is a front view showing the structure of the rotor frame of the motor for a laundry apparatus of one embodiment.

FIG. 7 is a rear view showing the structure of the rotor frame of the motor for a laundry apparatus of one embodiment.

FIG. 8 is a side view showing the structure of the rotor frame of the motor for a laundry apparatus of one embodiment.

FIG. 9 is an enlarged view showing area "B" of FIG. 8.

FIG. 10 is a partial perspective view showing that a hole constituting a suction port, a first guide part, and a second guide part are formed in an edge portion of the rotor frame in the motor for a laundry apparatus of one embodiment, and that suctioned air flows upward.

FIG. 11 is an enlarged view showing area "A" of FIG. 1, in which air suctioned through a suction port formed in an edge portion flows up toward a coil.

FIG. 12 is a partially enlarged view showing that air suctioned by the suction port, the first guide part, and the second guide part formed in an edge portion of the rotor frame in the motor for a laundry apparatus of one embodiment flows upward.

FIG. 13 is a perspective view showing a comparative example for comparison with the rotor frame of one embodiment.

FIG. 14 is an enlarged view showing a portion of the comparative example illustrated in FIG. 13.

FIG. 15 is a view showing a difference in the height at which a coil is wound in the embodiment of the present disclosure and the height at which a coil is wound in the comparative example.

DETAILED DESCRIPTION OF EXEMPLARY EMBODIMENTS

The above-described aspects, features and advantages are specifically described hereinafter with reference to accompanying drawings such that one having ordinary skill in the art to which the subject matter of the present disclosure pertains can embody the technical spirit of the disclosure easily. In the disclosure, detailed description of known technologies in relation to the subject matter of the disclosure is omitted if it is deemed to make the gist of the disclosure unnecessarily vague. Hereinafter, preferred embodiments according to the disclosure are specifically described with reference to the accompanying drawings. In the drawings, identical reference numerals may denote identical or similar components.

The terms "first", "second" and the like are used herein only to distinguish one component from another component, but the components are not to be limited by the terms. Certainly, a first component may be a second component, unless stated to the contrary.

Throughout the disclosure, each component may be provided as a single one or a plurality of ones, unless stated otherwise.

When any one component is described as being "in the upper portion (or the lower portion)" or "on (or under)" another component, any one component may be directly on (or under) another component, and an additional component may be interposed between the two components.

When any one component is described as being "connected", "coupled" or "connected" to another component, any one component may be directly connected or coupled to another component, but an additional component may be "interposed" between the two components, or the two components may be "connected", "coupled" or "connected" by an additional component.

In the disclosure, singular forms include plural forms as well, unless explicitly indicated otherwise. In the disclosure, the terms "comprised of", "comprise", and the like do not imply necessarily including stated components or stated steps, and imply excluding some of the stated components or stated steps or including additional components or additional step.

In the disclosure, singular forms include plural forms as well, unless explicitly indicated otherwise. In the disclosure, the terms "comprised of", "comprise", and the like do not imply necessarily including stated components or stated steps, and imply excluding some of the stated components or stated steps or including additional components or additional step.

Throughout the disclosure, the terms "A and/or B" as used herein may denote A, B or A and B, and the terms "C to D" may denote C or greater and D or less, unless stated to the contrary.

[Entire Structure of Driving Device for Laundry Apparatus to which Motor for Laundry Apparatus is Applied]

FIG. 1 is a cross-sectional view showing an entire structure of a driving device for a laundry apparatus of one embodiment.

A driving device for a laundry apparatus 1000 comprises a motor for a laundry apparatus 100, a shaft connection part 190, a clutch 410, an inner shaft 310, an outer shaft 320, a gear 520, a bearing housing 600, and first and second bearings 610, 620.

Ordinarily, the driving device for a laundry apparatus 1000 may further comprise a variety of components available for a washing machine or a dryer and the like, in addition to the components described above.

The motor for a laundry apparatus 100 comprises a stator 110 and a rotor 120.

The stator 110 comprises a stator core 111 and a plurality of coils 113.

The rotor 120 comprises a plurality of magnets 121 and a rotor frame 130.

The plurality of magnets 121 may be disposed outside the stator 110 in such a way that an air gap is between the plurality of magnets 121 and the stator 110.

The rotor frame 130 denotes a cylindrical frame that fixes the plurality of magnets 121 and rotates outside the stator 110.

A driving shaft 510 connects to the rotation center of the rotor frame 130.

Additionally, the shaft connection part 190 for fastening the driving shaft 510 may be provided at the rotation center of the rotor frame 130.

For example, the shaft connection part 190 and the driving shaft 510 may be firmly fastened based on serration such that the shaft connection part 190 and the driving shaft 510 transfer rotational force mutually.

In other words, the driving shaft 510 and the rotor frame 130 may be fastened firmly, in such a way that one end portion of the driving shaft 510 is inserted into a hole (i.e., a serration-shaped hole) provided at a serration bushing 1912 of the shaft connection part 190 that is disposed at the center of the rotor frame 130. Accordingly, the driving shaft 510 may receive a rotational force of the rotor frame 130 and output torque needed for a laundry apparatus.

The shaft connection part 190 may be fixed to a central step part 141 that protrudes in the form of a step from a base frame 140 constituting the rotor frame 130.

For example, the shaft connection part 190 further comprise a rotor bushing 191 that is fixed to the central step part 141 of the base frame 140 by using a fastening screw 192.

The rotor bushing 191 further comprises a hub 1911 and a serration bushing 1912.

For example, the hub 1911 may be made of a resin material and be injection-molded.

The serration bushing 1912 may be integrated with the hub 1911 in such a way that the serration bushing 1912 is disposed at the rotation center of the hub 1911. In an example, the serration bushing 1912 may comprise a metallic material of high stiffness, and may be insert-injected into the hub 1911 in such a way that the serration bushing 1912 is integrated with the hub 1911.

The serration bushing 1912 may have a serration-shaped hole, at the center thereof, and the driving shaft 510 may be partially inserted into the serration-shaped hole and firmly fastened to the serration-shaped hole.

The shaft connection part 190 may further have an additional clutch bushing, in the upper portion of the shaft connection part 190.

The clutch 410 may slide up and down along the shaft lengthwise direction of the driving shaft 510, based on an operation of a solenoid 420, to adjust an output of a laundry apparatus, i.e., a washing machine and the like, such that the clutch 410 may selectively connect to and disconnect from the clutch bushing.

A rotational force of the motor for a laundry apparatus 100 may be transferred to the driving shaft 510 through the rotor frame 130 rotating, and then output as predetermined torque through the inner shaft 310 and/or the outer shaft 320.

The inner shaft 310 and the outer shaft 320 may be installed in such a way that the inner shaft 310 and the outer shaft 320 have the same center as the driving shaft 510.

For example, the inner shaft 310 may connect to the rotor 120, to receive a rotational force of the motor for a laundry apparatus 100. Additionally, the outer shaft 320 may selectively connect to the rotor 120.

The clutch 410 may control a connection and a disconnection between the outer shaft 320 and the rotor 120, based on an operation of the solenoid 420.

Further, a seal part 330 may be provided between the inner shaft 310 and the outer shaft 320. The seal part 330 seals a space between the inner shaft 310 and the outer shaft 320.

Additionally, an oilless bearing 340 may be further provided between the inner shaft 310 and the outer shaft 320.

Further, the gear 520 comprises a sun gear 521 and a planetary gear 523.

The sun gear 521 is configured to connect to the driving shaft 510 and to rotate together with the driving shaft 510.

The planetary gear 523 may be disposed to surround the outside of the sun gear 521 and provided with a plurality of planetary gears 523. The planetary gear 523 may receive a rotational force of the sun gear 521, engage with the sun gear 521, and rotate at a set gear ratio.

The bearing housing 600 is disposed in the lower portion of the tub of a laundry apparatus, i.e., a washing machine, does not rotate and is fixed to the tub. The bearing housing 600 may have a structure in which the upper end and the lower end of the bearing housing 600 are supported by the first bearing 610 and the second bearing 620.

[Motor for Laundry Apparatus]

FIG. 2 is a half cross-sectional perspective view showing a motor for a laundry apparatus of one embodiment, FIG. 3 is a partial perspective view showing the structure of a suction port of the motor for a laundry apparatus of one embodiment, and FIGS. 4 to 8 are views showing the structure of a rotor frame of the motor for a laundry apparatus of one embodiment.

The motor for a laundry apparatus 100 comprises a stator 110 and a rotor 120.

The stator 110 comprises a core 111 and a plurality of coils 113.

The core 111 is disposed inside the rotor 120. For example, the core 111 may be provided in the form of a ring that surrounds around the driving shaft 510 (see FIG. 1) in a circumferential direction.

The coil 113 may be wound around the core 111 and mounted on the core 111. A plurality of coils 113 may be provided at the core 110. For example, the plurality of coils 113 may be mounted in the circumferential direction, on the core 113 shaped into a ring, at predetermined intervals.

In the case where the volume of the coil 113 wound increases, the output or efficiency of the motor may improve. Accordingly, to ensure improvement in the output or efficiency of the motor, a space where the coil 113 is wound needs to be obtained sufficiently.

The rotor 120 comprises a plurality of magnets 121 and a rotor frame 130.

While the plurality of magnets 121 is disposed circularly outside the coil 113, the magnets 121 are spaced from each other with a constant air gap between each magnet 121 and the stator 110.

The rotor frame 130 may be a frame which has a cylinder shape and one surface of which is open, and the plurality magnets 121 may be installed and fixed along the inner circumferential surface of the rotor frame 130 in the circumferential direction.

The rotor frame 130 may be rotated outside the stator 110, by a magnetic force between the plurality of coils 113 and the plurality of magnets 121.

The driving shaft 510 (see FIG. 1) is fastened to the shaft connection part 190 (see FIG. 1) disposed at the center of the rotor frame 130, and rotates together with the rotor frame 130.

Specifically, the rotor frame 130 comprises a base frame 140, an extension frame 180, an edge portion 145, and an upper edge portion 147.

The base frame 140 denotes a frame of a circular plate, which is spaced from the coil 113 in a heightwise direction and disposed to face the coil 113.

The shaft connection part 190 may be coupled to the center inside the base frame 140 having a circular plate shape.

The shaft connection part 190 is coupled to the center of the base frame 140 rotating, and is serration-fastened to the driving shaft 510 (see FIG. 1). For example, the shaft connection part 190 may be fastened onto the central step part 141 that convexly protrudes upward from the center inside the base frame 140 in a stepped manner, by using a fastening screw 192. An inclined circumferential surface 1411 connecting the step gently in an inclined manner may be further provided outside the central step part 141.

The shaft connection part 190 may comprise a rotor bushing 191.

For example, the rotor bushing 191 may be firmly coupled to the central step part 141 by a plurality of fastening screws 192, and comprise a hub 1911 and a serration bushing 1912.

The hub 1911 is made of a resin material and injection-molded, and denotes a portion constituting an entire body of the rotor bushing 191.

The serration bushing 1912 may be made of a metallic material of excellent stiffness, unlike the hub 1911, and the serration bushing 1912 may be serration-coupled to the driving shaft 510 firmly (see FIG. 1) while the serration bushing 1912 is disposed at the rotation center of the hub 1911.

The serration bushing 1912 may be manufactured in such a way that the serration bushing 1912 is integrated with the hub 1911.

For example, as the hub 1911 of a resin material is injected, the serration bushing 1912 of a metallic material is insert-injected, such that the serration bushing 1912 is manufactured in such a way that that the serration bushing 1912 is integrated with the hub 1911.

The serration bushing 1912 may have a serration-shaped hole, at the center thereof.

The driving shaft 510 (see FIG. 1) is partially inserted into the hole of the serration bushing 1912 and serration-fastened to the hole of the serration bushing 1912, such that the driving shaft 510 (see FIG. 1) receives a rotational force of the rotor frame 130 and outputs necessary torque.

The extension frame 180 denotes a frame having a circular tube shape that connects along the circumferential direction at the edge of the base frame 140.

The plurality of magnets 121 may be fixed to the inner circumferential surface of the extension frame 180.

The extension frame 180 may form the lateral surface of the rotor frame 130 and have a constant thickness.

As the extension frame 180 having a circular tube shape integrally connects to the based frame 140 having a circular plate shape, the rotor frame 130 may be shaped into a cylinder the height of which is entirely less than a diameter.

The stator 110 comprising the core 111 and the coil 113 is disposed in the rotor frame 130 shaped into a cylinder.

The edge portion 145 as a portion of the rotor frame 130 denotes an edge portion that connects the base frame 140 having a circular plate shape, and the extension frame 180 having a circular tube shape integrally.

Specifically, the edge portion 145 integrally connects between an edge part of the base frame 140 having a circular plate shape, and the extension frame 180 having a circular tube shape and connecting from the edge part of the base frame 140.

For example, the edge portion 145 denotes an edge portion having a L-shaped cross section between the base frame 140 and the extension frame 180.

The edge portion 145 has more excellent structural strength and stiffness than the base frame 140 having a circular plate shape or the extension frame 180 having a circular tube shape of constant thickness.

Accordingly, in the case where the edge portion 145 has a hole and the like for suctioning air, the edge portion 145 as a portion less affected by deterioration in stiffness, caused by deformation, than the base frame 140 or the extension frame 180 may be an optimal position for forming a suction port 160.

In other words, a suction port 160 formed at the edge portion 145 may help to prevent deterioration in the stiffness of the rotor frame 130 and enhance the heat dissipation performance of the motor, unlike a suction port 160 of related art, which is formed at the base frame 140 or the extension frame 180.

Additionally, the rotor frame 130 of the motor 100 for a laundry apparatus in the embodiment further comprises an upper edge portion 147.

The upper edge portion 147 may have a shape in which the upper edge portion 147 protrudes outward from the upper end portion of the extension frame 180 by a predetermined length.

Since the upper edge portion 147 is provided in such a way that the upper edge portion 147 bends outward from the upper end portion of the extension frame 180, stiffness in the upper end portion of the extension frame 180 may increase, and the deformation of the rotor frame 130 may be suppressed at a time of high-speed rotation.

[Structure of Suction Port Disposed at Edge Portion of Rotor Frame]

Referring to FIGS. 3 to 8, the suction port 160 in the motor 100 for a laundry apparatus in the embodiment comprises a plurality of holes 161 that suctions air outside the motor 100 into the motor 100.

The plurality of holes 161 is disposed at the edge portion 145, and at a time when the rotor frame 130 rotates, air outside the rotor frame 130 may be suctioned into the rotor frame 130.

A plurality of holes 161 disposed at the edge portion 145 may help to secure stiffness further than a suction port formed at an existing base frame 140 or extension frame 180.

Additionally, disposing the plurality of holes 161 at the edge portion 145 denotes disposing each of the plurality of holes 161 in the circumferential direction, at an outermost side of the base frame 140 in the radial direction thereof. With the structure, the plurality of holes 161 is disposed at a position with the highest flow velocity of air, such that air is suctioned sufficiently despite removal of a blade of related at, while the heat dissipation performance of the motor improves.

As described above, the suction port 160 is not provided with a blade 260 (see FIG. 13) protruding from the base frame 140 toward the coil 113.

Thus, lack of a coil winding space, caused by a protruding structure of the blade 260 (see FIG. 13), may be prevented, and the volume of the coil may increase by as much as a necessary volume of the coil without increasing the size of the motor. As a result, the output and efficiency of the motor may improve.

Referring to FIG. 3, each of the plurality of holes 161 constituting the suction port 160 is disposed at the edge portion 145.

The edge portion 145 denotes an edge portion of an L-shaped cross section, in which the base frame 140 and the extension frame 180 connect across each other.

The plurality of holes 161 may be formed in such a way that the plurality of holes 161 penetrates the edge portion 145 in a thicknesswise direction.

Accordingly, the plurality of holes 161 penetrating the edge portion 145 in the thicknesswise direction may help to prevent deterioration in the stiffness of the motor itself further than a plurality of holes 161 formed in such a way that the plurality of holes 161 penetrates the base frame 140 having a circular plate shape or the extension frame 180 having a circular tube shape in the thicknesswise direction.

In other words, in the case where the edge portion 145, as an edge portion having an L-shaped cross section, has the plurality of holes 161, deterioration in the stiffness of the edge portion 145 is less than that in the stiffness of the base frame 140 or the extension frame 180 that is thin.

Hereinafter, a specific structure of the suction port 160 is described.

The suction port 160 comprises a plurality of holes 161.

The plurality of holes 161 is formed in such a way that the plurality of holes 161 penetrates the edge portion 145.

At this time, the plurality of holes 151 is arranged as a whole in such way that each hole 161 is spaced from each other along the edge of the base frame 140 in the circumferential direction.

Accordingly, air outside the motor 100 for a laundry apparatus in which the rotor frame rotates may smoothly flow into the motor through the plurality of holes 161.

Additionally, it is preferable to form the plurality of holes 161 toward a tangent line direction T1 with respect to a rotation direction R1 of the base frame 140, near the edge of the base frame 140 (see FIG. 4).

In the case where the plurality of holes 161 is formed toward the tangent line direction T1, with respect to a rotation direction of the rotor frame, i.e., a rotation direction R1 of the base frame 140 as described above, an amount of air suctioned into the motor may increase at a time when the rotor rotates.

In other words, since the each hole 161 is disposed in the circumferential direction at an outermost side of the base frame 140 in the radial direction thereof, the plurality of holes 161 is disposed at a position with the highest flow velocity of air. Thus, the amount of air suctioned increases at a time when the base frame 140 rotates, and the heat dissipation performance of the motor improves.

[Guide Structure Guiding Suctioned Air Toward Coil]

Referring to FIGS. 3 to 8, the suction port 160 in the motor 100 for a laundry apparatus in the embodiment further comprises a plurality of guide structures 170.

The plurality of guide structures 170 denotes a structure that is disposed near the hole 161, to guide a flow of air suctioned through the plurality of holes 161.

The plurality of holes 161 is disposed in the circumferential direction, along the edge of the base frame 140, toward the tangent line, with respect to a rotation direction of the base frame 140, such that air is suctioned into the motor.

The plurality of guide structures 170 moves a flow direction of air suctioned into the motor through the plurality of holes 161 up toward the coil 113 (see FIG. 12).

In the case where the plurality of guide structures 170 moves suctioned air toward the coil 113 (see FIG. 12) as a component generating heat significantly, a cooling effect on the coil 113 (see FIG. 12) may improve.

To this end, it is preferable to dispose one guide structure 170 in each hole 161. In this context, the number of the plurality of the guide structures 170 may correspond to the number of the plurality of holes 161.

Each guide structure 170 comprises a first guide part 171.

The first guide part 171 may move a flow direction of air suctioned into the rotor frame 130 further upward than each of the plurality of holes by a predetermined height (see FIG. 10).

In other words, air suctioned into each of the plurality of holes 161 formed at the edge portion 145 moves up, along the first guide part 171 formed near the hole 161, at the rear of the hole 161 (see FIG. 10).

In the rotor frame 130, the coil 113 (or the core 111) is a main heat generation part. Accordingly, as air suctioned into the motor through the plurality of holes 161 moves up toward the coil 113 (or the core 111) along the first guide 171, the coil 113 (or the core 111) may cool effectively. As a result, the heat dissipation performance of the motor may improve.

For example, the first guide part 171 may be shaped into a circular arc having a predetermined length L1 (see FIG. 7), along the edge portion 145, inside the rotor frame 130. The first guide part 171 may be disposed near each of the plurality of holes 161.

Accordingly, air suctioned into the motor through each of the plurality of holes 161 may move up toward the coil along the first guide part 171 disposed inside the edge portion 145.

To this end, the first guide part 171 may have an inclination surface 172 the height of which increases as the inclination surface 172 becomes far away from each hole 161, in the upper portion thereof.

The inclination surface 172 denotes a smooth surface the height of which increases as the inclination surface 172 becomes far away from each hole 161.

The inclination surface 172 guides a flow direction of air suctioned into the rotor frame toward the coil 113 disposed further upward than the hole 161 by moving the flow direction up.

The inclination surface 172 may be disposed in the form of a circular arc having a predetermined length L1 (see FIG. 7) along the edge of the base frame 140.

FIG. 9 is an enlarged view showing area "B" of FIG. 8, and FIG. 10 is a view showing the shapes of a hole and a first guide part that are disposed at the edge portion.

Referring to FIGS. 9 and 10, the first guide part 171 has an inclination surface 172 the height of which increases as the inclination surface 172 becomes far away from the hole 161, in the upper portion thereof.

Specifically, one end portion 1711 of the first guide part 171 may be disposed close to each hole 161 and have a height corresponding to the lower end of each hole 161.

Additionally, one end portion 1711 of the first guide part 171 may have the same height as the upper surface of the base frame 140.

Further, the other end portion 1712 of the first guide part 171 may be disposed far from each hole 161 and have a height corresponding to the upper end of each hole 161.

Since there is a difference in the height of one end portion 1711 and the height of the other end portion 1712 of the first guide part 171 as described above, the inclination surface 172 the height of which increases as the inclination surface 172 becomes far away from the hole 161 may be formed in the upper portion of the first guide part 171.

The inclination surface 172 moves air suctioned through the hole 161 up to move the air toward the coil 113 disposed further upward than the hole 161.

Further, each guide structure 170 further comprises a second guide part 173 together with the first guide part 171.

The second guide part 173 may be formed in such a way that the second guide part 173 connects to the first guide part 171 and has a constant height.

The second guide part 173 may guides a flow of air having moved up to a proper height along the inclination surface 172 of the first guide part 171 toward the coil 113, and extend the first guide part 171 having the inclination surface 172, at the rear of the first guide part 171, at a constant height, and support the first guide part 171. With the configuration, deterioration in the stiffness of the motor may be prevented.

The first guide part 171 has an inclination surface 172 the height of which increases as the inclination surface 172 becomes far away from each hole 161, but unlike the second guide part 173, unlike the first guide part 171, is shaped into a step formed to have a constant height from the base frame 140.

Additionally, the second guide part 173 shaped into a step may have a horizontal surface 174 being at the same height as the upper end of the inclination surface 172 of the first guide part 171, in the upper portion thereof (see FIG. 10).

Referring to FIG. 9, one end portion 1731 of the second guide part 173, specifically, may have a height corresponding to the other end portion 1712 of the first guide part 171.

Further, the other end portion 1732 of the second guide part 173 may have the same height as one end portion 1731 of the second guide part 173.

The horizontal surface 174 is shaped into a smooth surface that connects between one end portion 1731 and the other end portion 1732 of the second guide part 173 and has a constant height.

The horizontal surface 174 may be provided inside the edge portion 145 formed along the edge of the base frame 140, in the form of a circular arc having a predetermined length L2.

Additionally, the inclination surface 172 of the first guide part 171 and the horizontal surface 174 of the second guide part 173 may have the same circular arc length or a similar circular arc length (see FIG. 10).

Since the first guide part 171 and the second guide part 173 are formed together as described above, an upward movement of air suctioned through the plurality of holes 161 and a flow of air suctioned through the plurality of holes 161 toward the coil may be ensured, and a structural stiffness may improve further.

As described above, in the motor 100 for a laundry apparatus of the embodiment, the suction port 160 is disposed at the edge portion 145 of the rotor frame 130 and has the plurality of holes 161, and the first and second guide parts 171, 172 are formed near the hole 161.

Thus, deterioration in the stiffness of the rotor frame may be prevented, and limits of a coil winding space 142 (see FIG. 15), caused by a protruding structure of an existing blade 260 (see FIG. 13), may be solved.

FIG. 11 is an enlarged view showing area "A" of FIG. 1, and FIG. 12 is a conceptual view showing that air suctioned into the motor by the suction port and the plurality of guide structures formed in the edge portion of the rotor frame moves up toward the coil 113.

Referring to FIGS. 11 and 12, the suction port 160 comprising the plurality of holes 161 is disposed at the edge portion 145.

Air outside the motor 100 is suctioned into the motor 100 through the suction port 160, i.e., a hole 161, disposed at the edge portion 145.

Additionally, air suctioned into the motor 100 moves to a higher position than the hole 161 along the plurality of guide structures 170 (see FIG. 12). Air suction based on an operation of guiding a flow direction performed by the plurality of guide structures 170 (see FIG. 12) moves toward the coil 113 (or the core 111).

Referring to FIG. 12, the first guide part 171 provided with the inclination surface 172 moving suctioned air up is disposed at every position adjacent to each hole 161.

Additionally, as the second guide part 173 connects to the first guide part 171, the horizontal surface 174 of the second guide part 173 horizontally connects at the same height from the upper end of the inclination surface 172. The guide structure 170 configured as described above moves air suctioned from the hole 161 toward the coil 113 (or the core 111), such that the heat dissipation performance of the motor improves while deterioration in the stiffness of the motor is suppressed.

In particular, the plurality of holes 161 is disposed in the tangent line direction with respect to the rotation direction R1 of the rotor frame 130, such that each hole 161 is disposed in the circumferential direction, at an outermost side of the base frame 140 in the radial direction thereof. The position of the hole 161 described above, as a position with the highest flow velocity of air suctioned at a time of rotation of the rotor frame 130, may result in an increase in the amount of suctioned air without applying an additional blade 260 (see FIG. 13).

FIG. 13 is a perspective view showing a comparative example of a rotor frame to which an existing blade is applied, and FIG. 14 is an enlarged view showing a portion of the comparative example illustrated in FIG. 13.

Referring to FIGS. 13 and 14, the rotor frame 230 of the comparative example illustrated comprises a suction port 250 and a blade 260.

The suction port 250 comprises a hole 251, and is provided at the base frame 240 shaped into a circular plate constituting the bottom of the rotor frame 230.

Additionally, one blade 260 is disposed with respect to each of a plurality of holes 251, and formed to protrude from the base frame 240 to have a predetermined height.

Additionally, a bead 245 having a protruding shape is provided at the base frame 240, a shaft connection part 290 to which a driving shaft connects is provided at the center of the base frame 240, and the shaft connection part 290 comprises a rotor bushing 291.

Referring to FIG. 14, in the rotor frame 230 of the comparative example, the bead 245 and the blade 260 are elongated along the radial direction of the base frame 240, up to a position where the bead 245 and the blade 260 face a coil.

FIG. 15 is a view showing a difference in the height of a coil winding space of the embodiment and the height of a coil winding space of the comparative example.

Referring to FIG. 15, in the case of an existing rotor frame 230 of the comparative example, the bead 245 and the blade 260 are disposed up to a coil winding space 142, in the base frame 240. Accordingly, a lower end 113*a* of a coil 113 faces the bead 245 and the blade 260 protruding to have a set height, such that the volume of wound coil 113 decreases by the height at which the bead 245 and the blade 260 protrude. Accordingly, to enhance the output and efficiency of the motor based on an increase in the volume of the coil 113, the size of the motor needs to increase entirely.

On the contrary, the rotor frame 130 of the embodiment is provided with the suction port 160 for cooling a motor, and the hole 161 of the suction port 160 of the embodiment is disposed at the edge portion 145.

That is, while a protruding structure (i.e., the bead 250, the blade 260 and the like) facing the lower end 113*a* of the coil 113 is removed, the hole 161 is formed at the edge portion 145, such that the stiffness of the rotor frame 130 improves.

Thus, since the hole 161 is disposed at the edge portion 145, the stiffness of the motor improves while an amount of suctioned air increases, such that the heat dissipation performance of the motor improves. Further, limits of the coil winding space 142, caused by a protruding structure such as the blade 260 and the like, are solved, such that the output and efficiency of the motor improve without an increase in the size of the motor.

As illustrated in FIG. 15, in an existing rotor frame 230 of the comparative example, the coil 113 may have a height of CH1.

On the contrary, in the rotor frame 130 of the embodiment, the coil 113 may have a height of CH2.

As a result, in the structure of the rotor frame 130 of the embodiment, the hole 161 of the suction port 160 is disposed at the edge portion 145, the coil winding space 142 may be additionally obtained by G, such that a compact and highly efficient motor is secured.

The embodiments are described above with reference to a number of illustrative embodiments thereof. However, embodiments are not limited to the embodiments and drawings set forth herein, and numerous other modifications and embodiments may be drawn by one skilled in the art within the technical scope of the disclosure. Further, the effects and predictable effects based on the configurations in the disclosure are to be included within the range of the disclosure though not explicitly described in the description of the embodiment.

The invention claimed is:

1. A motor for a laundry apparatus, comprising:

a stator comprising (i) a stator core that has a ring shape and (ii) a coil that is wound around the stator core; and a rotor comprising (i) a magnet that is disposed outside the stator with an air gap between the magnet and the stator and (ii) a rotor frame that supports the magnet and is configured to rotate about the stator, wherein the rotor frame comprises:

a base frame that faces the coil and is spaced apart from the coil, the base frame having a circular shape, an extension frame that is connected to an edge of the base frame and extends along the edge of the base frame in a circumferential direction, wherein the magnet is fixed to an inner circumferential surface of the extension frame, and an edge portion disposed at a connection portion between the extension frame and the base frame, the edge portion defining a suction port configured to suction air into the rotor frame based on rotation of the rotor frame.

2. The motor of claim 1, wherein the edge portion has an L-shaped cross section and connects the base frame and the extension frame to each other.

3. The motor of claim 1, wherein the suction port comprises:

a plurality of holes defined at the edge portion and configured to suction the air from an outside of the rotor frame into the rotor frame based on rotation of the rotor frame.

4. The motor of claim 1, wherein the suction port comprises:

a plurality of holes that pass through the edge portion and are configured to suction the air from an outside of the rotor frame into the rotor frame based on rotation of the rotor frame.

5. The motor of claim 1, wherein the suction port comprises:

a plurality of holes that pass through the edge portion and are configured to suction the air from an outside of the rotor frame into the rotor frame based on rotation of the rotor frame, and wherein the plurality of holes are arranged along the edge of the base frame in the circumferential direction and spaced apart from one another by a predetermined distance in the circumferential direction.

6. The motor of claim 5, wherein the plurality of holes are oriented in a tangential line direction of rotation of the rotor frame.

7. The motor of claim 1, wherein the suction port comprises:

a plurality of holes defined at the edge portion and configured to suction the air from an outside of the rotor frame into the rotor frame based on rotation of the rotor frame; and a plurality of guides configured to guide a flow direction of the air suctioned into the rotor frame through the plurality of holes.

8. The motor of claim 1, wherein the suction port comprises:

a plurality of holes defined at the edge portion and configured to suction the air from an outside of the rotor frame into the rotor frame based on rotation of the rotor frame; and a plurality of guides configured to guide a flow direction of the air suctioned into the rotor frame through the plurality of holes, and wherein each of the plurality of guides comprises a first guide part that is configured to guide the flow direction of the air suctioned into the rotor frame upward relative to each of the plurality of holes.

9. The motor of claim 8, wherein the first guide part is disposed inside the rotor frame and extends along the edge portion, the first guide part being disposed adjacent to each of the plurality of holes.

10. The motor of claim 8, wherein the first guide part comprises an inclination surface configured to guide the flow direction of the air suctioned into the rotor frame toward the coil, and wherein a height of the inclination surface from the base frame increases as the inclination surface extends away from each of the plurality of holes.

11. The motor of claim 10, wherein the inclination surface has an arc shape extending along the edge of the base frame.

12. The motor of claim 8, wherein the first guide part has:

a first end portion that is disposed at a corresponding one of the plurality of holes, the first end portion being disposed at a height corresponding to a lower end of the corresponding one of the plurality of holes; and a second end portion that is spaced apart from the corresponding one of the plurality of holes, the second end portion being disposed at a height corresponding to an upper end of the corresponding one of the plurality of holes.

13. The motor of claim 1, wherein the suction port comprises:

a plurality of holes defined at the edge portion and configured to suction the air from an outside of the rotor frame into the rotor frame based on rotation of the rotor frame; and a plurality of guides configured to guide a flow direction of the air suctioned into the rotor frame through the plurality of holes, and wherein each of the plurality of guides comprises:

a first guide part configured to guide the flow direction of the air suctioned into the rotor frame upward relative to each of the plurality of holes, and a second guide part that is connected to the first guide part and defines a constant height from the base frame.

14. The motor of claim 13, wherein the first guide part is disposed inside the rotor frame and extends along the edge portion, the first guide part being disposed adjacent to each of the plurality of holes, wherein the first guide part comprises an inclination surface, wherein a height of the inclination surface from the base frame increases as the inclination surface extends away from one of the plurality of holes, wherein the second guide part comprises a horizontal surface that defines a step with respect to the base frame, and wherein a height of the horizontal surface from the base frame is equal to the height of the inclination surface at an upper end of the inclination surface.

15. The motor of claim 14, where the horizontal surface extends in an arc shape along the edge of the base frame.

16. The motor of claim 14, wherein an arc length of the inclination surface corresponds to an arc length of the horizontal surface along the edge of the base frame.

17. A motor for a laundry apparatus, comprising:

a stator comprising (i) a stator core that has a ring shape and (ii) a coil that is wound around the stator core;

a rotor comprising (i) a magnet that is disposed outside the stator with an air gap between the magnet and the stator and (ii) a rotor frame that supports the magnet and is configured to rotate about the stator; and a driving shaft configured to receive a rotational force from the rotor frame, wherein the rotor frame comprises:

a shaft connection part disposed at a center of the rotor frame and connected to the driving shaft, a base frame that faces the coil and is spaced apart from the coil, the base frame having a circular shape about the center of the rotor frame, an extension frame that is connected to an edge of the base frame and extends along the edge of the base frame in a circumferential direction, wherein the magnet is fixed to an inner circumferential surface of the extension frame, a lower edge portion disposed at a connection portion between a lower end portion of the extension frame and the base frame, the lower edge portion defining a suction port configured to suction external air into the rotor frame based on rotation of the rotor frame, and an upper edge portion that extends radially outward from an upper end portion of the extension frame.

18. The motor of claim 17, wherein the suction port comprises:

a plurality of holes defined at the lower edge portion and configured to suction the external air from an outside of the rotor frame into the rotor frame based on rotation of the rotor frame, the plurality of holes passing through the lower edge portion.

19. The motor of claim 18, wherein the plurality of holes are arranged along the edge of the base frame in the circumferential direction and spaced apart from one another by a predetermined distance.

20. The motor of claim 18, wherein the plurality of holes are oriented in a tangential line direction of rotation of the rotor frame.

21. The motor of claim 17, wherein the suction port comprises:

a plurality of holes defined at the lower edge portion and configured to suction the external air from an outside of the rotor frame into the rotor frame based on rotation of the rotor frame; and a plurality of guides configured to guide a flow direction of the external air suctioned into the rotor frame through the plurality of holes, wherein each of the plurality of guides comprises:

a first guide part configured to guide the flow direction of the external air suctioned into the rotor frame upward relative to each of the plurality of holes, and a second guide part that is connected to the first guide part and defines a constant height from the base frame.

22. The motor of claim 21, wherein the first guide part is disposed inside the rotor frame and extends along the lower edge portion, the first guide part being disposed adjacent to each of the plurality of holes, wherein the first guide part comprises an inclination surface, wherein a height of the inclination surface from the base frame increases as the inclination surface extends away from one of the plurality of holes, wherein the second guide part comprises a horizontal surface that defines a step with respect to the base frame, and wherein a height of the horizontal surface from the base frame is equal to the height of the inclination surface at an upper end of the inclination surface.

* * * * *